(12) United States Patent
Shiflett et al.

(10) Patent No.: US 7,731,931 B2
(45) Date of Patent: Jun. 8, 2010

(54) STORAGE MATERIALS FOR HYDROGEN AND OTHER SMALL MOLECULES

(75) Inventors: Mark Brandon Shiflett, New Castle, DE (US); Subramaniam Sabesan, Wilmington, DE (US); Steven Raymond Lustig, Landenberg, PA (US); Pratibha Laxman Gai, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 824 days.

(21) Appl. No.: 11/126,737

(22) Filed: May 11, 2005

(65) Prior Publication Data

US 2005/0252373 A1 Nov. 17, 2005

Related U.S. Application Data

(60) Provisional application No. 60/570,162, filed on May 11, 2004.

(51) Int. Cl.
*C09C 1/56* (2006.01)
*C01B 31/00* (2006.01)
*C01B 31/08* (2006.01)

(52) U.S. Cl. .................. 423/460; 423/445 R; 502/418

(58) Field of Classification Search ................ 423/445, 423/460, 445 B, 447.1, 447.2, 447.3, 448; 502/416, 430, 437
See application file for complete search history.

(56) References Cited

U.S. PATENT DOCUMENTS 4,142,949 A * 3/1979 Faul et al. .................. 205/468
5,071,820 A 12/1991 Quinn et al.
5,389,350 A * 2/1995 Freeman et al. ............. 423/230
5,653,951 A 8/1997 Rodriguez et al.
2002/0020292 A1* 2/2002 Wojtowicz et al. ........... 95/116
2003/0118907 A1 6/2003 Shiraishi et al.
2004/0247957 A1* 12/2004 Hatano et al. ................ 429/19

OTHER PUBLICATIONS

Ozturk, et al., Rapid pyrolysis of cellulose with reactive hydrogen gas in a single-pulse shock tube, Fuel 1995; 74(11): 1658-1663.*
Savova, et al., Biomass conversion to carbon adsorbents and gas, Biomass and Bioenergy 2001; 21: 133-142.*
Lustig, et al., Capillary Densification of Hydrogen in Nanoporous, Amorphous Carbons, Mater. Res. Soc. Symp. Proc. 2006; 927: 1-6.*
Marek A. Wojtowicz et al., Microporous Carbon Adsorbents for Hydrogen Storage, Int. J. of The Soc. of Mat. Eng. for Resources, vol. 7(2):253-266, 1999.
R. Chahine et al., Characterization and Optimization of Adsorbents for Hydrogen Storage, Hydrogen Energy Progress XI, Proceedings of the World Hydrogen Energy Conference, 11th, Stuttgart, Jun. 23-28, vol. 2:1259-1263, 1996.
M. G. Nijkamp et al., Hydrogen storage using physisorption—materials demands, Appl. Phys. A, vol. 72:619-623, 2001.

* cited by examiner

*Primary Examiner*—Stanley S. Silverman
*Assistant Examiner*—Daniel C. McCracken

(57) ABSTRACT

This invention relates to adsorbents useful for storing hydrogen and other small molecules, and to methods for preparing such adsorbents. The adsorbents are produced by heating carbonaceous materials to a temperature of at least 900° C. in an atmosphere of hydrogen.

17 Claims, 12 Drawing Sheets

STORAGE MATERIALS FOR HYDROGEN AND OTHER SMALL MOLECULES

FIELD OF THE INVENTION

This invention relates to adsorbents useful for storing hydrogen and other small molecules, and to methods for preparing such adsorbents.

BACKGROUND OF THE INVENTION

The need for a clean energy source has stimulated much effort in pursuit of hydrogen-based fuel-cell technologies. Obstacles to solving this problem have been the lack of practical systems for hydrogen storage and an inability to identify the key factors that promote optimal hydrogen storage. Adsorbents derived from carbonaceous materials have been widely studied, but do not yet meet all the requirements for hydrogen storage capacity, cost, and ease of manufacturing.

It has proved difficult to prepare carbon samples with high surface areas (1,500-3,000 $m^2/g$) from a wide variety of carbonaceous precursors. Previous approaches typically involved pyrolysis in either an oxidizing atmosphere (e.g., air) or an inert atmosphere (e.g., nitrogen). Previously disclosed hydrogen treatment processes were conducted at lower temperatures (50-400° C.), and were designed to remove impurities on the surface of fullerenes, carbon nanofibers, carbon nanotubes, carbon soot, nanocapsules, bucky onions, carbon fibers and other carbonaceous material Shiraishi et al. (US2003/0118907) disclose a hydrogen-storing carbonaceous material obtainable by heating a carbonaceous material in a gas atmosphere including hydrogen gas and substantially including no reactive gas as impurity gas.

Wojtowicz et al. (US2002/0020292) disclose a method for storing gas by carbonizing a carbonaceous precursor material in a substantially nonoxidizing atmosphere and at temperatures that attain an upper value of at least 1000° C. (to produce substantial graphitization of the carbon of the precursor material) and then introducing a gas (e.g., hydrogen) to be stored, under positive pressure, into a storage vessel containing a substantial amount of the sorbent material.

Wojtowicz et al. (*Int. J. Soc. Mat. Eng. Resources*, Vol. 7, No. 2, 253-266 (1999)) disclose the char-activation of polyvinylidene chloride to form a hydrogen storage material with high micropore volumes. No data is provided on the structural characterization (i.e., crystallinity or presence of turbostratic regions) of these materials.

Rodriquez et al. (U.S. Pat. No. 5,653,951) disclose a solid layered nanostructure comprised of crystalline regions, interstices (0.335 nm to 0.67 nm) within the crystalline regions, and nanostructure surfaces defining the interstices which have hydrogen chemisorption properties. A composition comprising the solid layered nanostructure with hydrogen stored in the interstices is also disclosed.

Nijkamp et al. (Appl. Phys. A 72, 619-623(2001)) and Chahine et al. (Hydrogen Energy Progress XI, Proceedings of the World Hydrogen Energy Conference, 11th, Stuttgart, Jun. 23-28, 1996, Vol. 2, 1259-1263) tabulate the hydrogen adsorption capacity, pore volumes and surface areas of several carbonaceous materials. No data is provided on the structural characterization (i.e., crystallinity or presence of turbostratic regions) of these materials.

Quinn et al. (U.S. Pat. No. 5,071,820) disclose a process for activating carbon to produce a carbon having a high micropore and low macropore volume by a series of steps of heating the carbon in the presence of oxygen, followed by heating the carbon in a nitrogen atmosphere. No data is provided on the structural characterization (i.e., crystallinity or presence of turbostratic regions) of these materials.

In the last several years, much effort has been made to understand the characteristics of carbon adsorbents that correlate with high storage capacity. Materials with high hydrogen storage capacity are of special interest. Nijkamp and others have observed that surface area seems to be a key factor for hydrogen storage, but it is clearly not the only one, since there is a great deal of scatter in the data for samples with moderate surface areas (1,000-1,500 $m^2/g$). Based on data obtained for these moderate surface area carbons, it has also been proposed that micropore volume is another key factor, even though the hydrogen adsorption data is also badly scattered for this variable.

SUMMARY OF THE INVENTION

This invention provides a process for producing carbon nanostructures, comprising heating a carbonaceous material in the presence of $H_2$ to a temperature of at least 900° C.

This invention also provides carbon nanostructures made by heating a carbonaceous material in the presence of $H_2$ to a temperature of at least 900° C.

This invention also provides carbon nanostructures characterized by having:
a. amorphous regions;
b. turbostratic regions;
c. surface areas of at least 1,500 $m^2/g$; and
d. total pore volume of at least 0.5 cc/g.

This invention also provides a process for storing small molecules selected from the group consisting of hydrogen, methane, oxygen, nitrogen and carbon dioxide, the process comprising introducing the small molecule into a storage vessel containing the carbon nanostructures of this invention.

This invention also provides a composition comprising carbon nanostructures characterized by having:
a. amorphous regions;
b. turbostratic regions;
c. surface areas of at least 1,500 $m^2/g$; and
d. total pore volume of at least 0.5 cc/g.

The invention also provides a composition that comprises turbostratic regions that comprise greater than 50% of the composition.

The invention also provides a composition that comprises carbon nanostructures characterized by having total BET surface area of 1500-2300 $m^2/g$.

The invention also provides a composition that comprises carbon nanostructures characterized by having a total pore volume of 0.5-5.5 cc/g.

The composition may further comprise adsorbed small molecules. The adsorbed small molecules may be selected from the group consisting of hydrogen, oxygen, nitrogen, methane and carbon dioxide. In some embodiments of the invention the adsorbed small molecule is hydrogen. The invention also includes a composition with adsorbed hydrogen wherein the adsorbed $H_2$ comprises at least 1 wt % of the composition at 10 bar and −160° C. to −180° C.

This invention also provides a process for separating mixtures of gases, comprising:
a. introducing a mixture of gases into a storage vessel containing the carbon nanostructures of this invention;
b. allowing the gases to at least partially equilibrate at elevated pressure to form adsorbed and non-adsorbed gases; and
c. reducing the pressure and removing at least a portion of the non-adsorbed gases.

The process for separating mixtures of gases may further comprise the step: d. further reducing the pressure and/or heating the carbon nanostructures to remove any additional non-adsorbed gases and at least a portion of the adsorbed gases.

FIGURES

DETAILED DESCRIPTION OF THE INVENTION

Figure 1A:
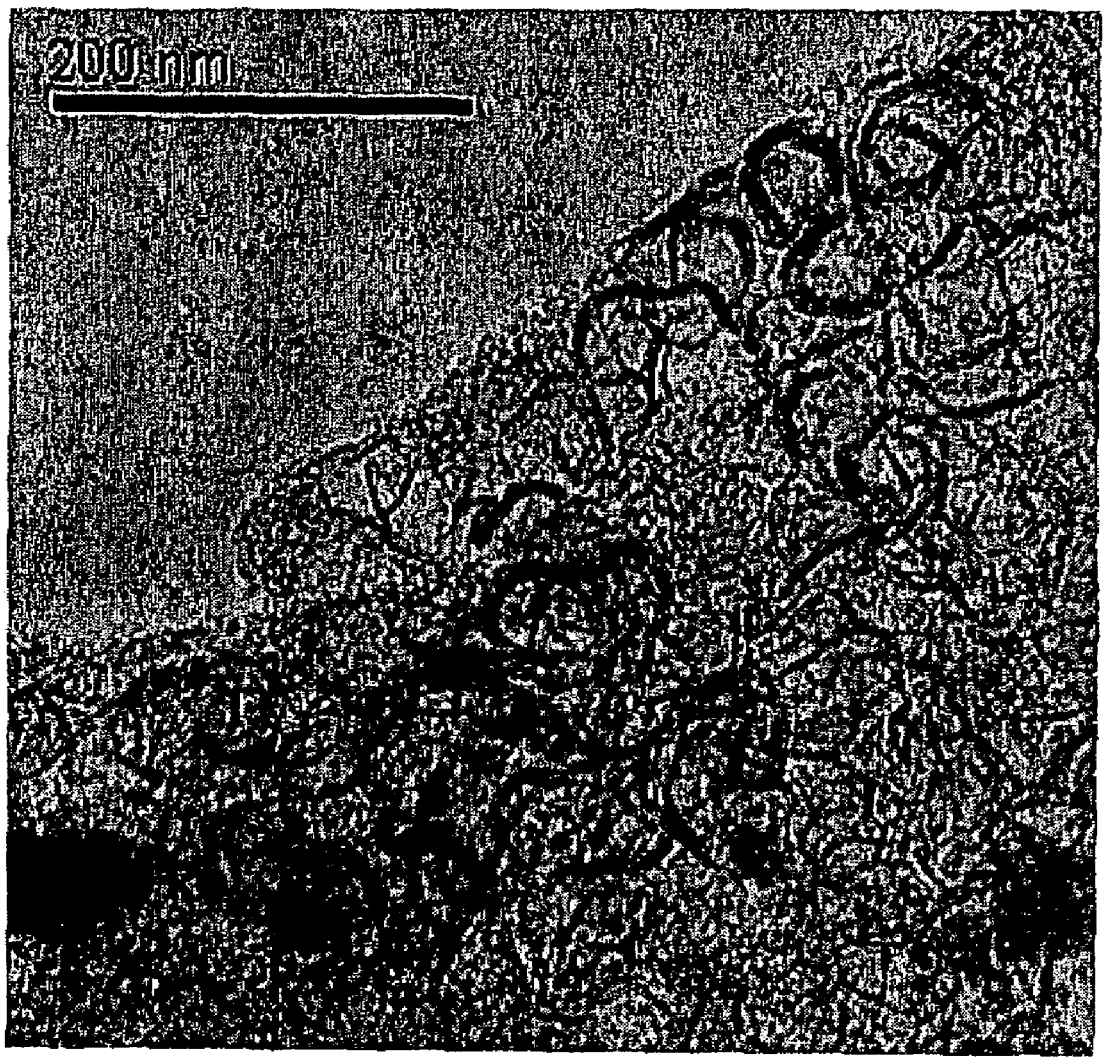
FIG. 1a is a low magnification TEM (transmission electron micrograph) of the chitosan-derived adsorbent of Example 6, showing the presence of both turbostratic graphite ribbons (TER) and amorphous regions (AR).
Figure 1B:
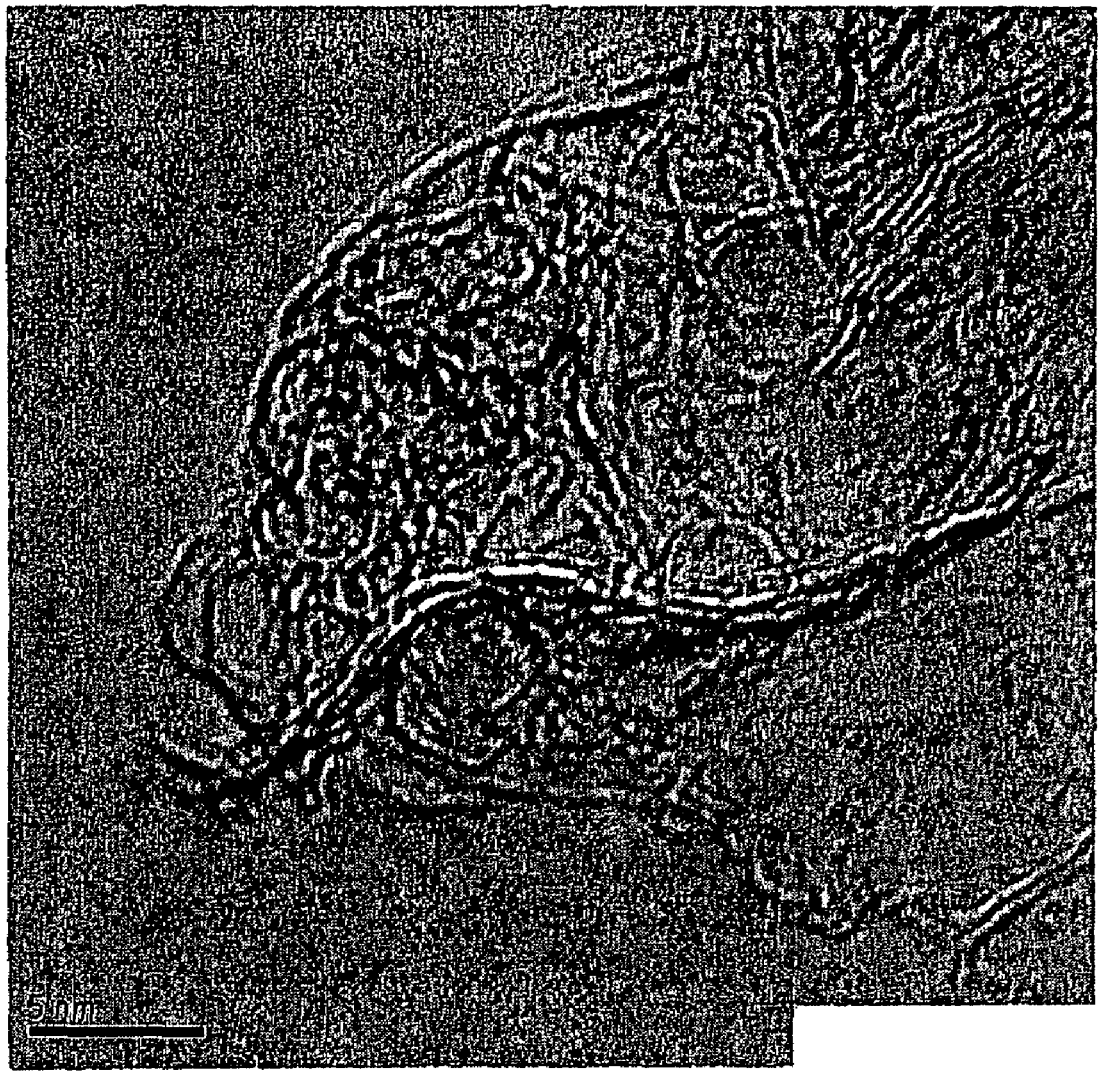
FIG. 1b is a high resolution TEM of a turbostratic region of the adsorbent of Example 6.
Figure 1C:
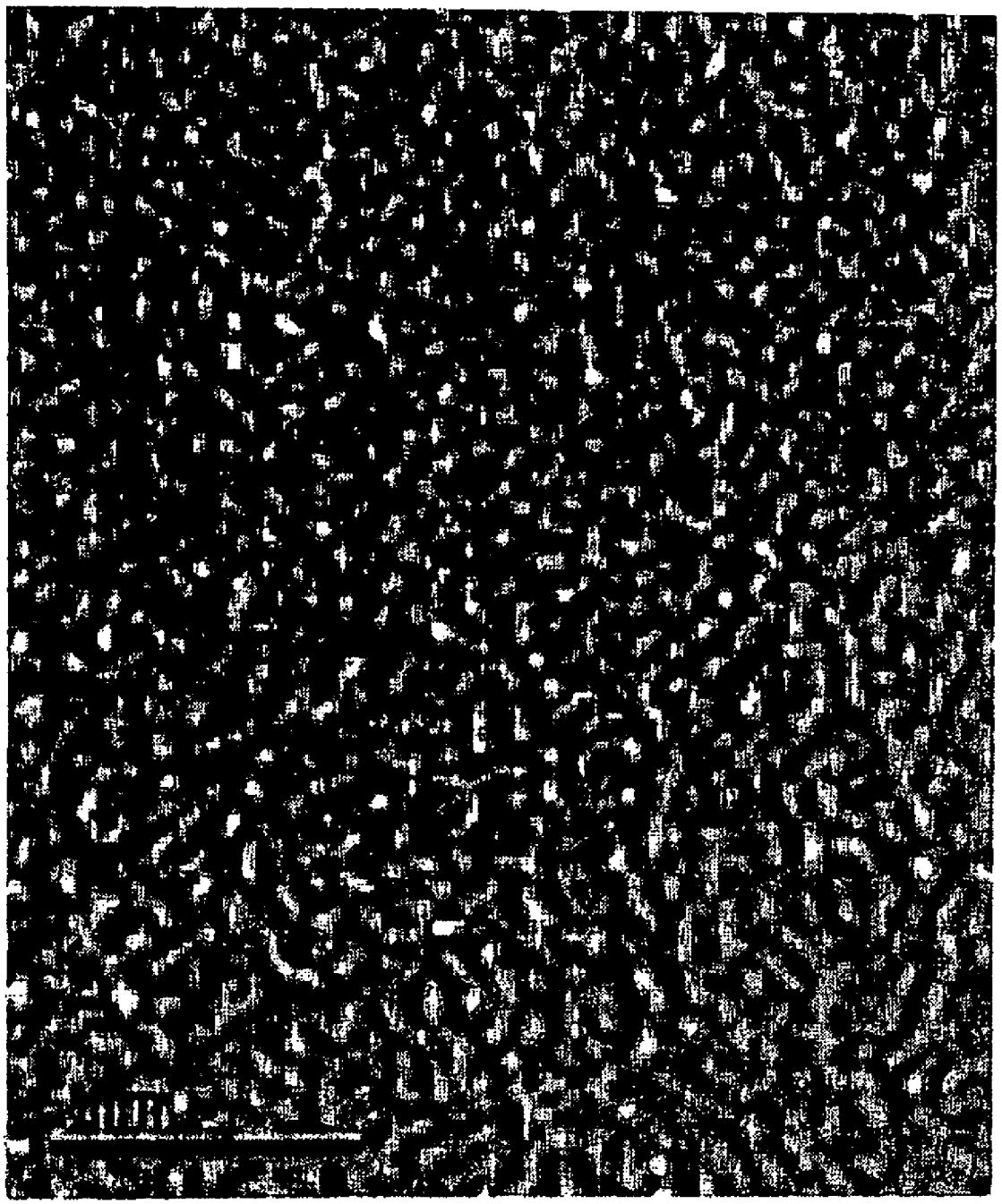
FIG. 1c is a TEM of amorphous carbon which has no long range order.
Figure 2A:
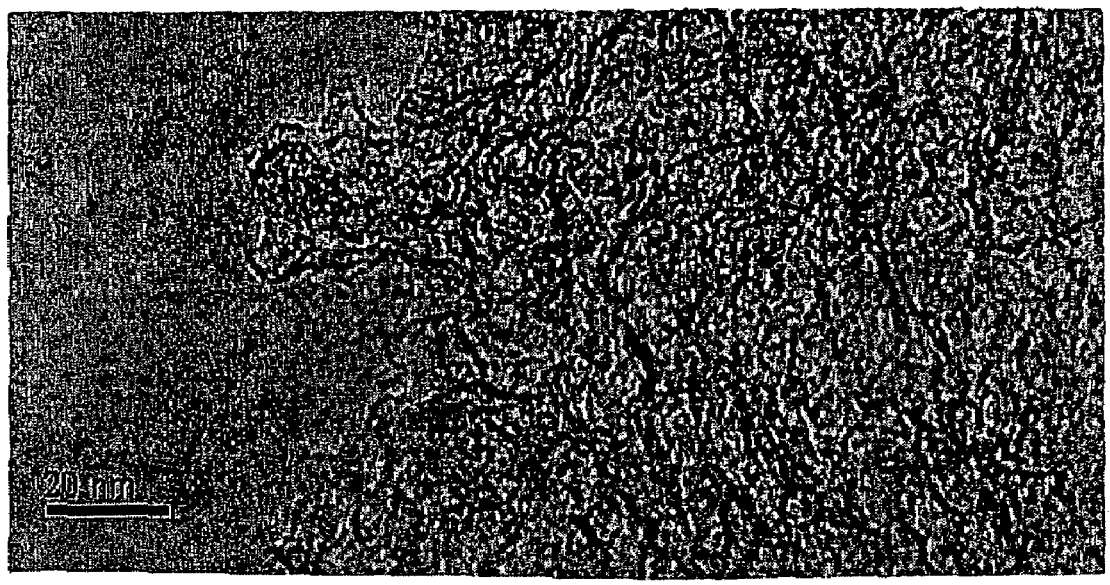
FIG. 2(a) is a low resolution TEM of the chitin-derived adsorbent of Example 7, showing the presence of turbostratic regions and amorphous regions.
Figure 2B:
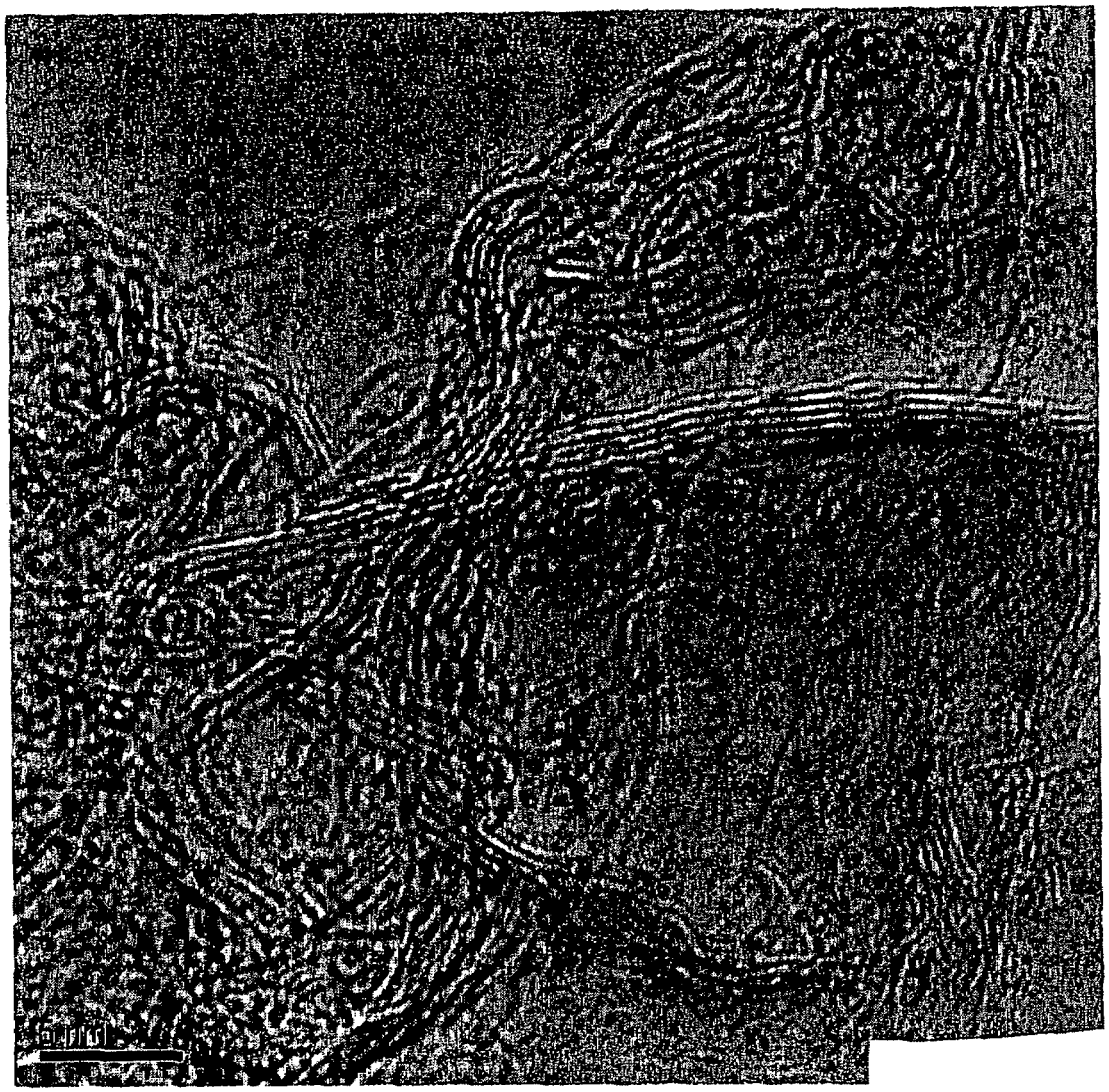
FIG. 2(b) is a high resolution TEM of the chitin-derived adsorbent of Example 7. The turbostratic graphitic sheets (TGS) are approximately 50-60 nm long.
Figure 3A:
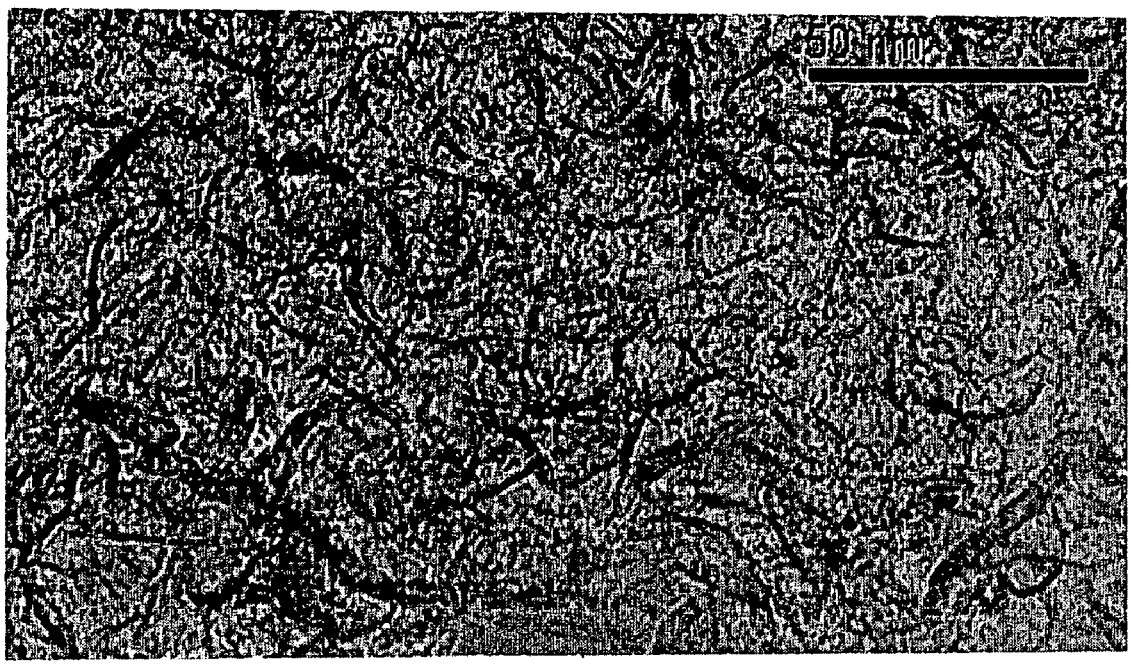
FIG. 3(a) is a low resolution TEM of the cellulose-derived adsorbent of Example 14, showing the "ribbon-like" turbostratic regions and amorphous regions. The "ribbons" are up to 50 nm long.
Figure 3B:
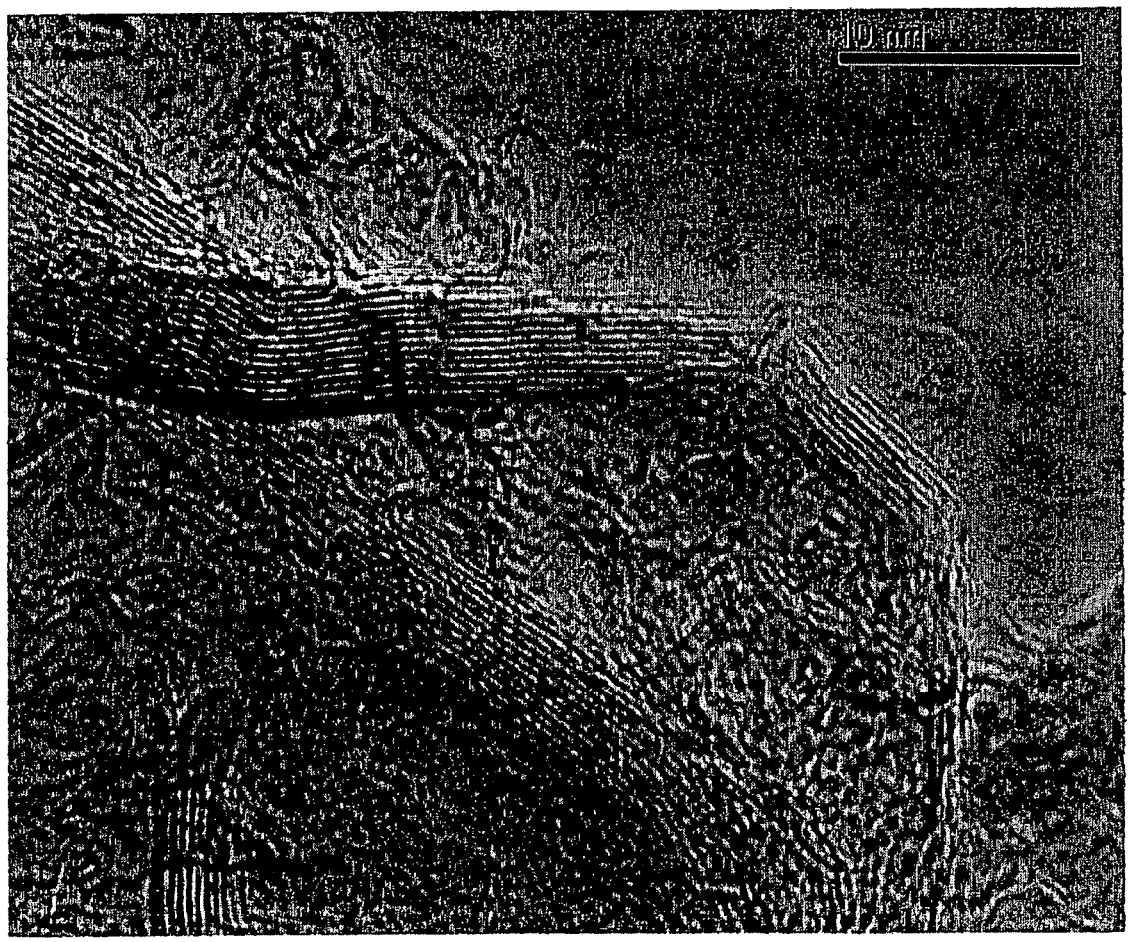
FIG. 3(b) is a high resolution TEM of the cellulose-derived adsorbent of Example 14, showing clearly the graphite-sheet structure of the "ribbon-like" turbostratic regions.

Applicants provide a process to produce carbon nanostructures characterized by high surface area, high total pore volume, and high hydrogen storage capacity by the pyrolysis of carbonaceous materials at high temperature (>900° C.) in the presence of hydrogen. These materials have both amorphous (i.e., non-crystalline) and turbostratic regions. The hydrogen treatment process of this invention comprises heating the carbonaceous material to a temperature of at least 900° C. in an atmosphere of hydrogen.

Carbonaceous materials suitable for use in this process include polysaccharides, carbohydrates, natural and synthetic polymers, and activated carbons. In one embodiment the carbonaceous materials are selected from chitosan, chitin, and cellulose.

In the process of this invention, the carbonaceous materials are heated to a temperature of at least 900° C., and generally less than 1600° C., for a time sufficient to generate the desired increase in pore volume and/or surface area. Heating the materials at temperatures of 900-1200° C. requires longer heating times to generate a given pore volume or surface area than heating an equivalent sample to 1200-1600° C. Heating to temperatures greater than 1400° C., although operable, may be detrimental to the storage capacity for hydrogen and other small molecules unless the heating time is kept very short (less than 1 hr). For many samples, heating to 1000-1200° C. for 2-48 hr provides the desired substantial increases in surface area, total pore volume and storage capacity. Optimizing the process conditions for a given type of carbonaceous precursor can done by optimizing one variable at a time (e.g., temperature, time, flow rate, etc.) or by a statistical design of experiments to optimize multiple variables simultaneously.

As is evident from the data in the Tables below, total BET surface area tends to increase with increasing pyrolysis temperature and/or hold time, up to a maximum of almost 2300 $m^2/g$ for some samples. Pore volumes also increase, up to about 5.3 cc/g. Further heating in hydrogen can result in a dramatic decrease in surface area, total pore volume, and adsorption capacity.

Applicants have discovered that high hydrogen storage capacity can be achieved in carbons with essentially no micropore volume, and that storage capacity is better correlated with total pore volume than with micropore volume. In the early stage of the pyrolysis, changes in micropore volume tend to be small. Once the surface area reaches about 1500 $m^2/g$, the micropore volume has decreased to a negligible value, as measured by nitrogen porosimetry. Surprisingly, pyrolysis under hydrogen dramatically increases the total pore volume for many samples, with maximum total pore volume and maximum surface area being obtained at about the same conditions of time and temperature for a given sample.

Transmission electron microscopy (TEM) reveals that the samples produced by this invention contain both amorphous regions and turbostratic regions. "Turbostratic" carbon is the term given to carbon morphology of 2-dimensionally ordered carbon (essentially graphitic sheets of carbon) that is not ordered in the direction perpendicular to the plane of the sheets. Turbostratic carbon can be considered to be an intermediate state in the transformation of amorphous carbon to graphitic carbon. In the carbon-based adsorbents used in this invention, the turbostratic regions contain turbostratic graphite fragments of at least 10 nm in length. Another embodiment of the invention uses carbon-based turbostratic graphitic fragments at least 20 nm in length.

Applicants speculate that the dramatic loss of surface area and pore volume observed for some samples may correspond to the transformation and consolidation of substantial portions of the carbonaceous material into these turbostratic, graphitic structures.

For use as hydrogen storage materials, carbons with both amorphous and turbostratic regions also preferably have total pore volumes of at least 0.5 cc/g.

The carbon nanostructures made by the process of this invention may also be used to store other small molecules, such as methane, oxygen, nitrogen and carbon dioxide.

The process of storing small molecules in the carbon nanostructures of this invention is carried out by exposing the carbon nanostructures of this invention to the small molecule under a suitable combination of pressure and temperature. Generally, low temperatures and/or high pressures are preferred to achieve high storage efficiencies (i.e., high wt % adsorbed small molecule).

The carbon nanostructures of this invention can also be used as the selective adsorbent in any one of several of the well-known gas separation processes. An example of such a gas separation process is an adiabatic process known as PSA. It is used to purify gases by removing any accompanying impurities by adsorption through suitable adsorbents in fixed beds contained in pressure vessels under high pressure. In a batch version of a PSA process, a mixture of gases to be separated is introduced into a pressure vessel that contains an adsorbent that has at least some selectivity for a subset of the gases in the mixture. After the gases have been introduced into the pressure vessel and been allowed to at least partially equilibrate, the pressure is reduced and at least a portion of the non-adsorbed gases is removed. This portion of the gases will be selectively enriched in one or more of the gases in the mixture and can be subjected to additional cycles of exposure to adsorbents at elevated pressure and removal at lower pressure. Similarly, the gases initially adsorbed onto the adsorbent can be removed by further reducing the pressure and/or heating the adsorbent. These gases can also be subjected to additional cycles of adsorption/desorption to further enhance the separation. PSA processes are frequently conducted in semi-batch mode using multiple pressure vessels (or adsorbent-loaded columns).

The carbon nanostructures of this invention can also be used in membrane separation processes in which either the adsorbents are fabricated into thin-films for gas separation or are incorporated into polymer membranes for increasing gas selectivity for a variety of gas separations. Such applications include but are not limited to separating oxygen and nitrogen from air, separating carbon dioxide and oxygen from air, separating hydrogen from syngas, separating hydrogen from hydrocarbons, and separating methane from natural gas.

Additional applications include using these materials in adsorption refrigeration cycles, purifying liquids such as water, and separating components from liquids. An example of the latter application is removing proteins from fermentation broths.

EXAMPLES

Electron Microscopy Procedures

Transmission electron microscopy (TEM) with atomic resolution and environmental transmission electron microscopy (ETEM) were used to understand the microstructure, morphology and chemical composition of the samples. Structural and high precision chemical compositional analyses were carried out using an advanced Tecnai field emission gun TEM/STEM instrument (Gai and Boyes, "EM in Het catalysi", *Inst of Physics Publ*(UK and USA), 2003). Additionally, microstructural investigations on the atomic scale at different temperatures were performed using a novel ETEM (Gai (E. I. du Pont de Nemours and Company, Wilmington, Del. USA), *Advanced Materials*, Vol 10, p. 1259, 1998)) using a modified Philips* CM30 instrument. All the EMs were equipped with X-ray spectrometers to analyze chemical compositions. The chemical composition analyses were performed by electron stimulated energy dispersive X-ray compositional spectroscopy (EDX), providing high spatial resolution on the (sub) nanometer scale.

Examples 1-16

Materials

Food grade chitosan (ChitoClear®, Lot Nos. 66 and 1232) was purchased from Primex Ingredients ASA (Avaldsnes, Norway). Chitosan 66 refers to a material with a molecular weight of about 385,000 g/mol. Chitosan 1232 refers to a material with a molecular weight of about 171,000 g/mol. Chitin was also obtained from Primex Ingredients ASA. Cellulose was obtained from Baker (Phillipsburg, N.J.). Darco carbon adsorbent was obtained from Sigma-Aldrich (St. Louis, Mo.). Chiba HSAG was obtained from Chiba University (Chiba, Japan).

Methods:

The carbon nanostructures used as hydrogen storage materials in these examples were prepared by placing weighed samples of carbonaceous precursors into alumina and graphite boats that were then inserted into the center of a tube furnace. The tube furnace was purged with ultrapure (99.995%) hydrogen at about 800 sccm. The furnaces were heated at approximately 1° C./min to the specified hold temperature for the specified hold time, and then allowed to cool under hydrogen to room temperature. The boats were removed and weighed to calculate yields. In the comparative examples described below, some of the carbonaceous precursors were also treated under a flow of argon at about 800 sccm.

The storage materials were characterized using nitrogen porosimetry to measure surface area and pore volumes. The total surface area, the macroporous surface area (i.e., surface area for pores greater than approximately 20 A), and the microporous surface area (i.e., surface area with pores less than approximately 20 A), were measured using standard methods. The total pore volume and the macroporous pore volume were also measured using standard methods; the microvolume volume is calculated from the difference in total and macroporous volume. In the Tables below, only the total surface area (BET SA), total pore volume (PV), and micropore volume (MPV) are reported.

The hydrogen storage capacities were measured using an intelligent gravimetric analyzer (IGA) from Hiden Isochema, Ltd., Warrington, England. Temperature was measured with a thermocouple placed slightly above the sample. A sample of about 50 to 100 mg was tested. Before exposing the sample to hydrogen, an outgas sequence was performed to remove any residual water or other contaminants in the sample. The sample chamber pressure was reduced to $10^{-5}$ to $10^{-6}$ torr and the sample was heated at 5° C./min to 250° C. for 6 hours or until no further weight loss was measured. The sample was allowed to cool down to room temperature and the pressure inside the chamber was increased with hydrogen to begin the hydrogenation sequence. In the hydrogenation process ultra-purified hydrogen (99.995%) was introduced into the sample chamber.

The pressure was increased to 10 mbar and the temperature was decreased using liquid nitrogen in a dewar surrounding the sample chamber. When the temperature stabilized between −180 to −160° C., the pressure was increased in steps from 10 mbar up to a maximum of 10000 mbar (10.0 bar). Applicants allowed the weight measurement at each step to reach equilibrium before proceeding to the next step. Once the final weight measurement was completed, the sample pressure was decreased in steps to measure hysteresis. The pressure, weight, and temperature of the sample were continuously recorded.

The gravimetric microbalance results were corrected for buoyancy of the hydrogen gas as a function of both pressure and temperature.

The results for samples treated with hydrogen at 900-1000° C. for 2-48 hours are summarized in Table 1 (containing Examples 1-16). $H_2$ adsorption results (H2 ADS) were obtained at temperatures of −160° C. to −180° C., and at a pressure of 3,000 mbar. H2 ADS data in parentheses indicate wt % $H_2$ adsorbed at 10,000 mbar.

Figure 4:
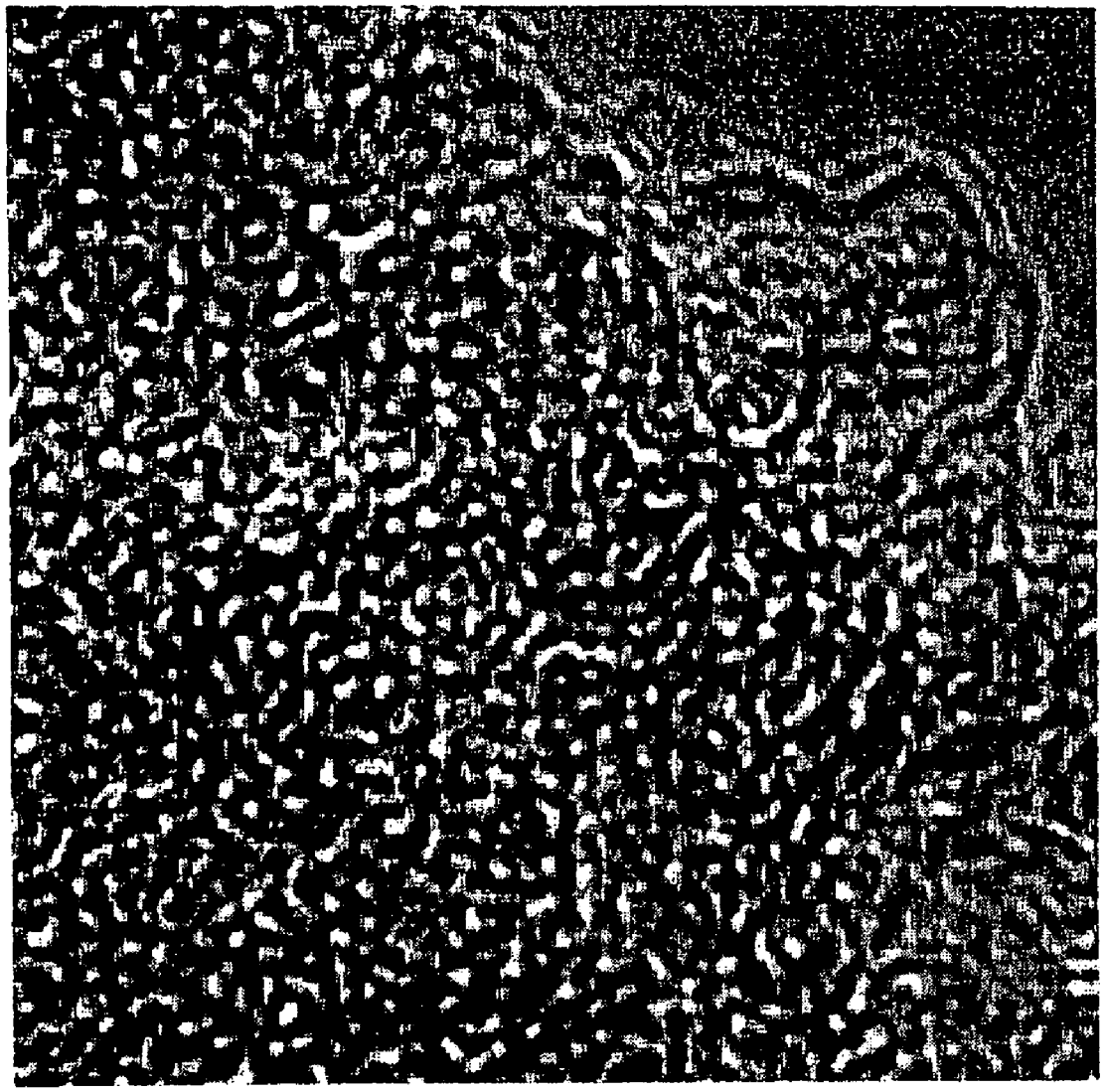
FIG. 4 is a low resolution TEM of a sample of a commercial carbon (Chiba HSAG) showing the predominance of amorphous regions (AR) and the lack of turbostratic features larger than about 3 nm.

Transmission electron micrographs of Examples 6, 7 and 14 are shown FIGS. 1*a-c*, 2*a-c*, and 3*a-c*, respectively. The turbostratic regions and amorphous regions can clearly be seen in these TEMs. FIG. 4 is a TEM of comparative sample of amorphous carbon (Chiba HSAG), in which the turbostratic regions contain fragment smaller than about 3 nm.

TABLE 1

Hydrogen Adsorption Properties

| Ex. | Material | Temp. (°C.) | Time (hr) | Yield (wt %) | BET SA m²/g | PV cc/g | MPV cc/g | H2 ADS wt % |
|---|---|---|---|---|---|---|---|---|
| 1 | Chitosan 66 | 1100 | 30 | 2.5 | 1879 | 1.92 | — | 3.7 |
| 2 | Chitosan 1232 | 1100 | 24 | 5.6 | 1828 | 1.45 | — | 2.3 |
| 3 | Chitosan 1232 | 1100 | 24 | 3.4 | 2062 | 1.81 | — | 7.3 |
| 4 | Chitosan 1232 | 1100 | 24 | 2.5 | 2153 | 2.01 | — | 8.4 |
| 5 | Chitosan 1232 | 1100 | 30 | 2.4 | 1873 | 1.79 | — | 10.2 |
| 6 | Chitosan 1232 | 1100 | 36 | 1.3 | 1960 | 5.33 | — | 4.9 |
| 7 | Chitin | 1100 | 24 | 2.4 | 1405 | 2.37 | — | 10.5 |
| 8 | Cellulose | 900 | 2 | 8.9 | 524 | 0.25 | 0.20 | 1.1 (2.6) |
| 9 | Cellulose | 1000 | 2 | 7.9 | 814 | 0.38 | 0.30 | 1.6 (3.0) |
| 10 | Cellulose | 1100 | 2 | 4.4 | 1505 | 0.77 | 0.46 | 2.0 (4.2) |
| 11 | Cellulose | 1200 | 2 | 2.8 | 1803 | 1.43 | — | 2.5 (5.7) |
| 12 | Cellulose | 1100 | 12 | 1.6 | 2127 | 2.04 | — | 2.8 (6.0) |
| 13 | Cellulose | 1100 | 24 | 1.9 | 1842 | 2.09 | — | 2.3 (5.3) |
| 14 | Cellulose | 1100 | 36 | — | 1560 | 2.04 | — | 4.2 (10.4) |
| 15 | Cellulose | 1100 | 48 | 1.8 | 1355 | 1.90 | — | 2.2 (5.2) |
| 16 | Darco | 1100 | 24 | — | 2292 | 3.8 | — | 3.1 (5.2) |

BET SA = BET surface area
PV = total pore volume
MPV = micropore volume
H₂ ADS = wt % H₂ adsorbed at 3,000 mbar by H₂-treated carbon material; data in parentheses is wt % H₂ adsorbed at 10,000 mbar.

Examples 17-23 and Comparative Examples A-C

Samples of chitosan (ChitoClear®, Lot No. 656, molecular weight=about 66,000 g/mol, Primex Ingredients ASA) were treated as described above for Examples 1-16, except that for the comparative examples A-C., argon was used instead of hydrogen. The results are summarized in Table 2.

A second chitosan sample, (ChitoClear®, Lot No. 1111, molecular weight=about 342,000 g/mol; Primex Ingredients ASA), was heated as described above for Examples 1-16, except that argon was used instead of hydrogen. This treatment produced results (not shown) that were similar to those of Examples 17-23 in which heating in an argon atmosphere at temperatures from 600-1200° C. was shown to be ineffective in increasing surface area of the sample. Heating chitosan (ChitoClear®, Lot No. 1111) to 900-1150° C. for 2-30 hours in hydrogen increased the BET surface area to as much as 1635 m²/g.

TABLE 2

Chitosan 656 Samples Treated in Hydrogen or Argon

| Ex. | Gas | Temp. (°C.) | Time (hr) | Yield (%) | BET SA m²/g | PV cc/g |
|---|---|---|---|---|---|---|
| 17 | H2 | 900 | 2 | 20.7 | 444 | 0.1942 |
| 18 | H2 | 1000 | 2 | 19.2 | 594 | 0.2612 |
| 19 | H2 | 1100 | 2 | 17.8 | 412 | 0.1830 |
| 20 | H2 | 1100 | 6 | 9.5 | 1534 | 0.7655 |
| 21 | H2 | 1100 | 12 | 4.3 | 2120 | 1.5479 |
| 22 | H2 | 1100 | 24 | 2.0 | 1006 | 1.3303 |
| 23 | H2 | 1100 | 48 | 0.6 | 116 | 0.2305 |
| A | Ar | 800 | 2 | 30.4 | <1 | — |
| B | Ar | 1000 | 2 | 27.4 | <1 | — |
| C | Ar | 1200 | 2 | 27.1 | <1 | — |

BET SA = BET surface area
PV = total pore volume
MPV = micropore volume
H₂ ADS = wt % H₂ adsorbed at 3,000 mbar by H₂-treated carbon material; data in parentheses is wt % H₂ adsorbed at 10,000 mbar.

These results demonstrate that heating carbonaceous materials at high temperatures in the presence of an inert gas does not necessarily lead to the formation of high surface area adsorbents.

Example 24

Pressure dependence of Hydrogen Adsorption

Figure 5:
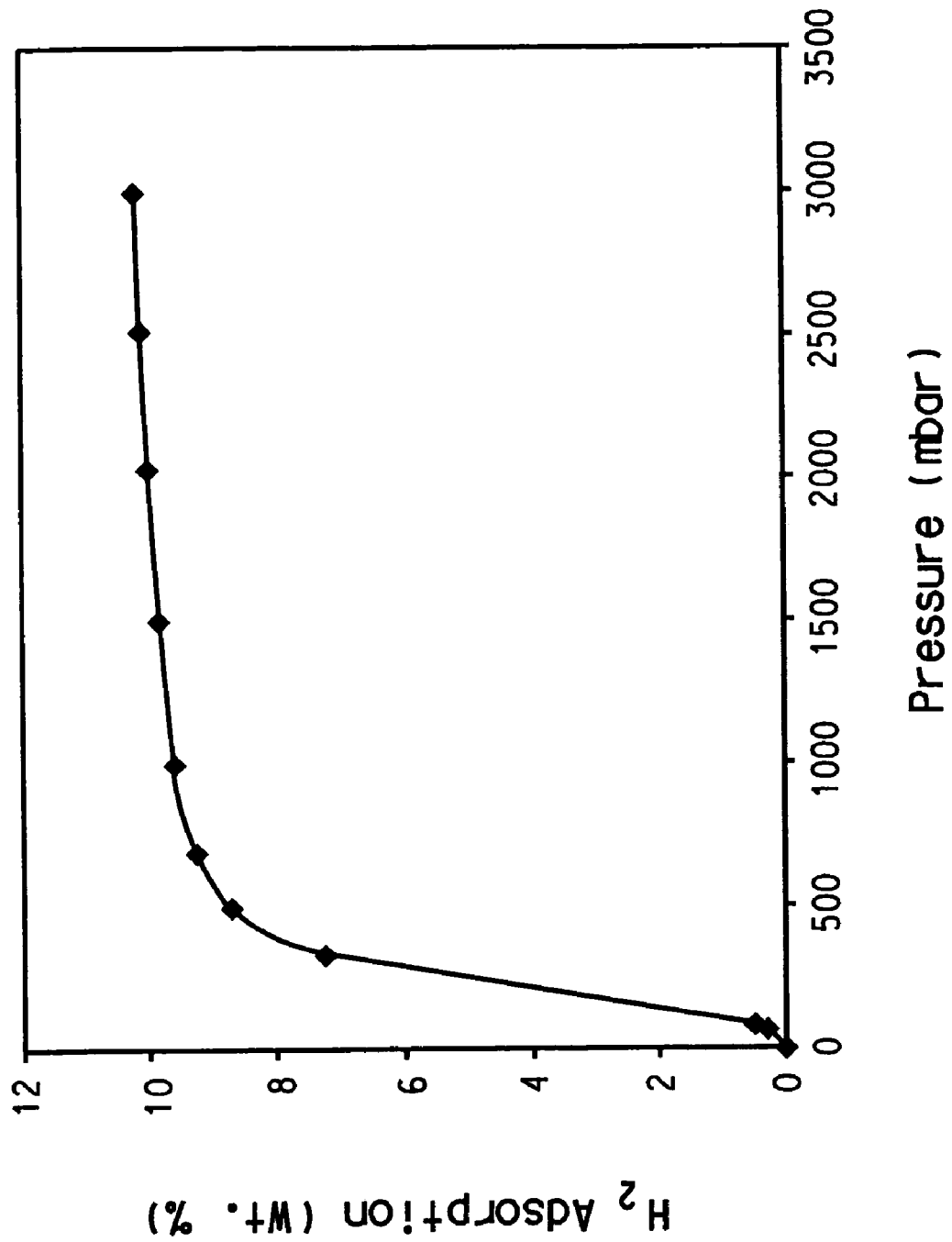
FIG. 5 is a graph of wt % $H_2$ adsorbed (at T=−162° C.) vs. pressure for a chitosan-derived (TM 1232) adsorbent sample treated at 1100° C. for 30 hr with $H_2$.

A sample of chitosan (ChitoClear®, Lot No. 1232) was treated with hydrogen at 1100° C. for 30 hr, as described above for Example 5, and then exposed to hydrogen at pressures from 10 mbar to 3,000 mbar. FIG. 5 shows the wt % H₂ adsorbed at T=−162° C. as a function of pressure.

Figure 6:
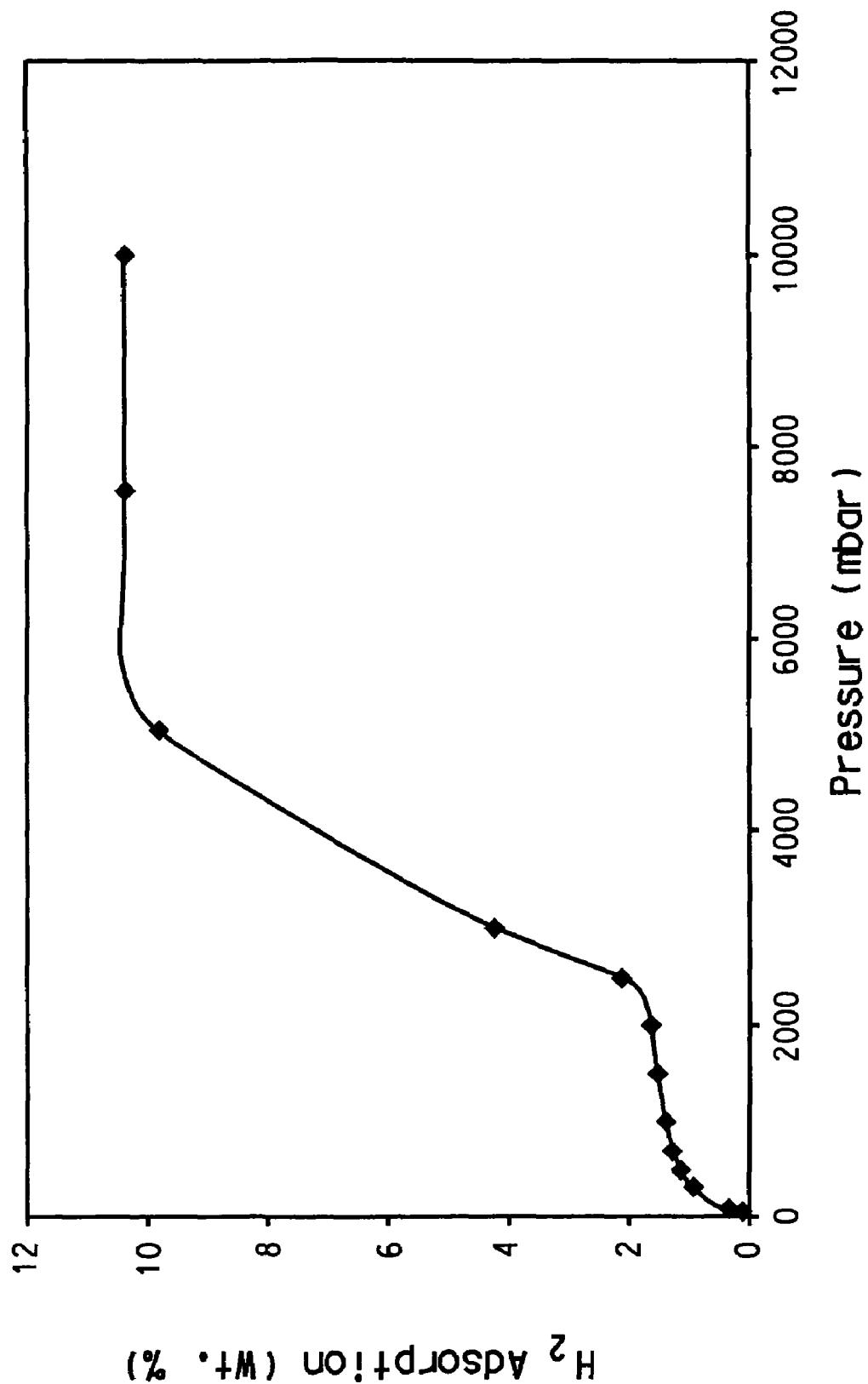
FIG. 6 is a graph showing the pressure dependence (at T=−166° C.) of a cellulose-derived hydrogen adsorbent treated at 1100° C. for 30 hr with $H_2$.

FIG. 6 shows the wt % H₂ adsorbed at T=−166° C. as a function of pressure for the cellulose-derived hydrogen adsorbent of Example 14. The adsorbent was treated with hydrogen at 1100° C. for 36 hours.

Example 25

DSC of Chitosan-Derived Hydrogen Adsorbent Exposed to Hydrogen

Figure 7:
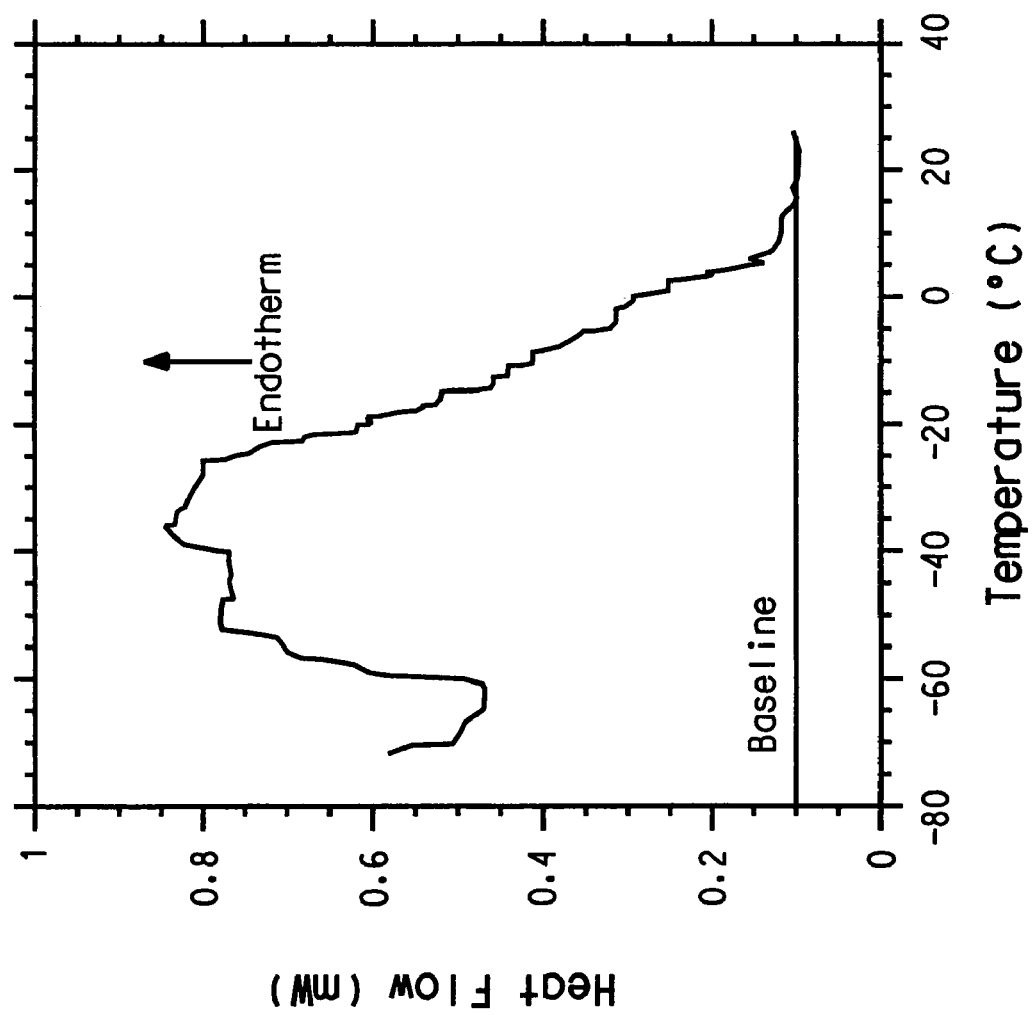
FIG. 7 is a graph showing DSC results for a chitosan-derived adsorbent.

Approximately 2 mg of a sample of chitosan (ChitoClear®, Lot No. 1232) previously treated at 1100° C. for 24 hr with H₂, was lightly packed into an open aluminum sample pan and installed in a differential scanning calorimeter (TA Instruments, model Q10, New Castle, Del.) with a blank aluminum reference pan. The instrument was run according to the manufacturer's instructions for sub-ambient temperatures and hydrogen under ambient pressure. A dewar was installed over the pans and filled with liquid nitrogen until the sample temperature was approximately −173° C. The dewar was quickly removed, the sample cell was quickly closed with the steel cover, the sample gas overhead was quickly flushed with helium, and finally the sample gas overhead was filled with hydrogen gas at approximately 1 atm pressure. The sample temperature was allowed to warm to room temperature at a rate of approximately 10° C./min while the Q10 instrument recorded the heat flow differential between the sample and reference pans. This signal was then reduced by a control signal obtained from the instrument under identical conditions, except that the sample pan was empty. The net signal provides the heat flow due only to the sample, as shown in FIG. 7.

An endothermic heat of approximately $9.1 \times 10^4$ J/kmol is measured at temperatures below approximately 20° C., consistent with the vaporization of condensed hydrogen phase within the sample.

Example 26

High Pressure Dependence of Hydrogen Adsorption

Figure 8:
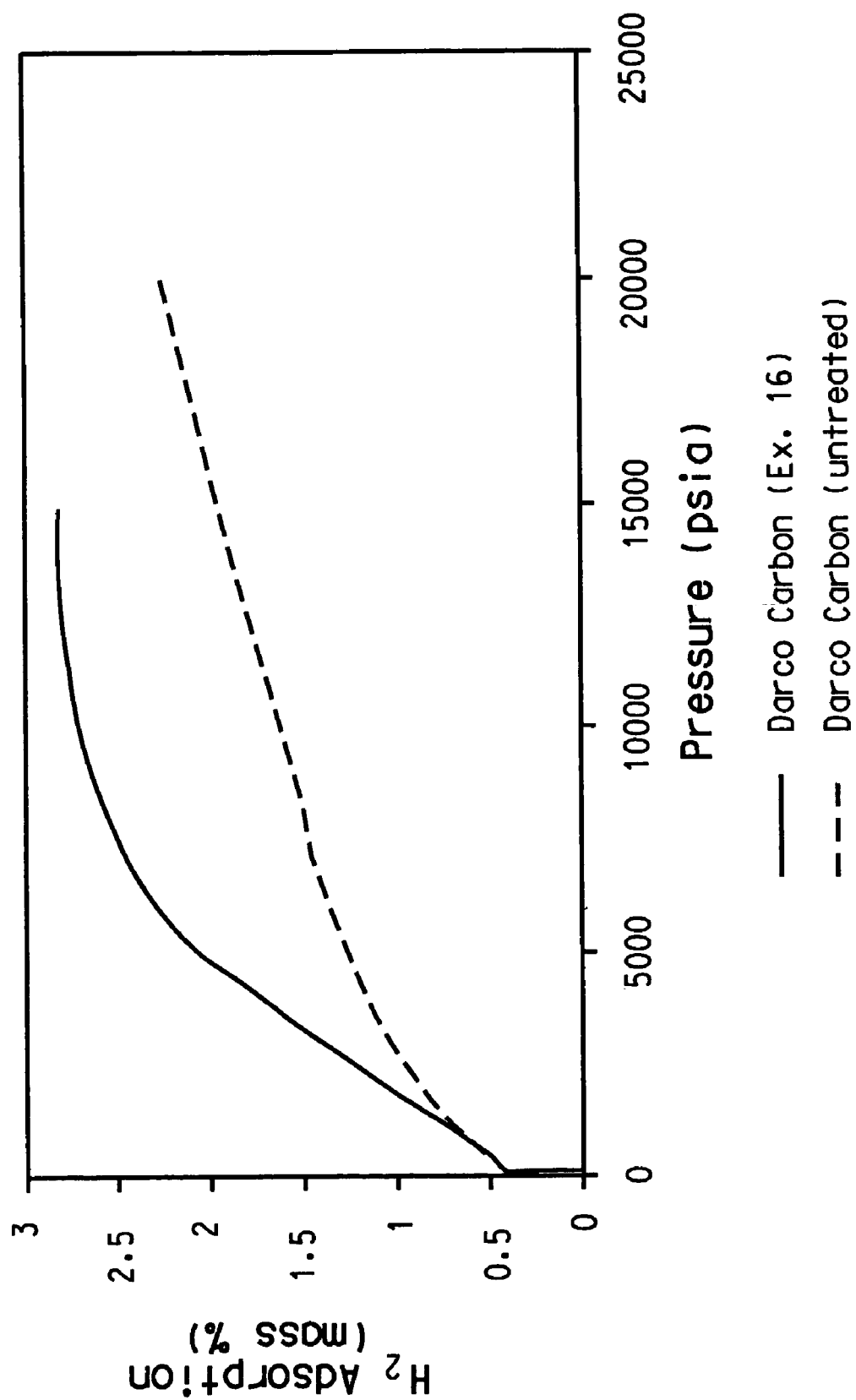
FIG. 8 shows the DSC results as wt % $H_2$ adsorbed as a function of pressure at room temperature for the untreated Darco carbon adsorbent of Example 16, for comparison.

A sample of Darco carbon was treated with hydrogen at 1100° C. for 24 hr, as described above for Example 16, and then exposed to hydrogen at pressures from 1 bar to 1360 bar (14.7 to 20,000 psia). FIG. 8 shows the wt % $H_2$ adsorbed as a function of pressure at room temperature.

For comparison, FIG. 8 shows the wt % $H_2$ adsorbed as a function of pressure at room temperature for the untreated Darco carbon adsorbent of Example 16.

What is claimed is:

1. A process for producing a composition that comprises carbon nanostructure, comprising heating a carbonaceous material in the presence of $H_2$ to a temperature of at least 900° C. for a time sufficient to generate an increase in pore volume and/or surface area of the material and form the carbon nanostructure, wherein the carbonaceous material is selected from the group consisting of polysaccharides, carbohydrates, and natural polymers.

2. The process of claim 1 wherein the weight percent yield of solid carbonaceous material after said heating is at least 0.6%.

3. The process of claim 1, wherein the carbonaceous material is heated to a temperature of 900-1600° C.

4. The process of claim 3, wherein the carbonaceous material is heated to a temperature of 1000-1200° C. for 2-48 hr.

5. The process of claim 1, wherein the heating is in the presence of a substantially $H_2$ atmosphere.

6. The process of claim 5, wherein the heating is for 2-48 hours.

7. The process of claim 1, wherein the carbon nanostructure comprises
   a. amorphous regions;
   b. turbostratic regions;
   c. a total BET surface area of at least 1,500 m²/g; and
   d. total pore volume of at least 0.5 cc/g.

8. The process of claim 7, wherein the turbostratic regions comprise greater than 5000 of the nanonstructure.

9. The process of claim 7, wherein the total BET surface area is 1500-2300 m²/g.

10. The process of claim 7, wherein the total pore volume is 0.5-5.5 cc/g.

11. The process of claim 1, wherein the carbonaceous material is a natural polymer.

12. The process of claim 11, wherein the natural polymer is selected from the group consisting of chitosan, chitin, and cellulose.

13. The process of claim 12, wherein the natural polymer is heated to a temperature of 1000-1200° C. for 2-48 hr.

14. The process of claim 13, wherein the heating is in the presence of a substantially $H_2$ atmosphere.

15. A process for producing a composition that comprises carbon nanostructure, comprising heating a carbonaceous material in the presence of $H_2$ to a temperature of 1000° C. to 1600° C. for a time sufficient to generate an increase in pore volume and/or surface area of the material and form the carbon nanostructure, wherein the carbonaceous material is a synthetic polymer.

16. The process of claim 15, wherein the carbonaceous material is heated to a temperature of 1000-1200° C. for 2-48 hr.

17. The process of claim 16, wherein the heating is in the presence of a substantially $H_2$ atmosphere.

* * * * *